United States Patent
da Silva et al.

(10) Patent No.: US 7,934,061 B2
(45) Date of Patent: *Apr. 26, 2011

(54) METHODS AND ARRANGEMENTS TO MANAGE ON-CHIP MEMORY TO REDUCE MEMORY LATENCY

(75) Inventors: Dilma Menezes da Silva, White Plains, NY (US); Elmootazbellah Nabil Elnozahy, Austin, TX (US); Orran Yaakov Krieger, Newton, MA (US); Hazim Shafi, Austin, TX (US); Xiaowei Shen, Hopewell Junction, NY (US); Balaram Sinharoy, Poughkeepsie, NY (US); Robert Brett Tremaine, Stormville, NY (US)

(73) Assignee: International Business Machines Corporation, Armonk, NY (US)

( * ) Notice: Subject to any disclaimer, the term of this patent is extended or adjusted under 35 U.S.C. 154(b) by 466 days.

This patent is subject to a terminal disclaimer.

(21) Appl. No.: 12/145,034

(22) Filed: Jun. 24, 2008

(65) Prior Publication Data

US 2008/0263284 A1 Oct. 23, 2008

Related U.S. Application Data

(63) Continuation of application No. 11/032,876, filed on Jan. 11, 2005, now Pat. No. 7,437,517.

(51) Int. Cl.
*G06F 12/00* (2006.01)
*G06F 13/00* (2006.01)
*G06F 3/00* (2006.01)

(52) U.S. Cl. ............. 711/141; 711/100; 711/154; 710/5

(58) Field of Classification Search .......... 711/100, 711/118, 141, 154; 710/5
See application file for complete search history.

(56) References Cited

U.S. PATENT DOCUMENTS

| | | | |
|---|---|---|---|
| 5,438,670 A * | 8/1995 | Baror et al. | 711/3 |
| 6,105,119 A * | 8/2000 | Kerr et al. | 711/219 |
| 6,738,864 B2 * | 5/2004 | Chauvel | 711/130 |
| 7,177,985 B1 | 2/2007 | Diefendorff | |
| 2003/0154349 A1 | 8/2003 | Berg et al. | |
| 2004/0103408 A1 | 5/2004 | Chilimbi et al. | |
| 2004/0236922 A1 | 11/2004 | Boucher et al. | |
| 2005/0114559 A1 | 5/2005 | Miller | |
| 2005/0144337 A1 | 6/2005 | Kahle | |
| 2005/0198439 A1 | 9/2005 | Lange et al. | |

(Continued)

OTHER PUBLICATIONS

Stenström, Per et al., "Comparative Performance Evaluation of Cache-Coherent NUMA and COMA Architectures," Proceedings of the 19th Annual International Symposium on Computer Architecture, ACM Press, 1992, pp. 80-91.

(Continued)

*Primary Examiner* — Tuan V. Thai
(74) *Attorney, Agent, or Firm* — Libby Z. Toub; Schubert Law Group PLLC

(57) ABSTRACT

Methods, systems, and media for reducing memory latency seen by processors by providing a measure of control over on-chip memory (OCM) management to software applications, implicitly and/or explicitly, via an operating system are contemplated. Many embodiments allow part of the OCM to be managed by software applications via an application program interface (API), and part managed by hardware. Thus, the software applications can provide guidance regarding address ranges to maintain close to the processor to reduce unnecessary latencies typically encountered when dependent upon cache controller policies. Several embodiments utilize a memory internal to the processor or on a processor node so the memory block used for this technique is referred to as OCM.

9 Claims, 2 Drawing Sheets

U.S. PATENT DOCUMENTS

2006/0085602 A1  4/2006  Huggahalli et al.
2006/0143513 A1  6/2006  Hillman et al.

OTHER PUBLICATIONS

Tomkins, Andrew et al., "Informed Multi_Process Prefetching and Caching," Proceedings of the 1997 ACM Sigmetrics, International Conference on Measurement and Modeling of Computer Systems, ACM Press, 1997, pp. 100-114.

Kimbrel, Tracy et al., "A Trace-Driven Comparison of Algorithms for Parallel Prefetching and Caching," Proceedings of the 1996 Symposium on Operating Systems Design and Implementation, 1996, pp. 19-34.

"Porting x86 Linux Device Drivers to AMD64 Technology," Advanced Micro Devices Inc., Last Updated Mar. 11, 2004; Accessed Oct. 4, 2006; http://www.amd.com/us-en/assets/content_type/DownloadedableAssests/Porting_x86_Linux_device_drivers_to_AMD64_Technology.htm., pp. 1-4.

Coady, Yvonne et al., "Using AspectC to Improve the Modularity of Path-Specific Customization in Operating System Code," Joint 8 European Software Engineering Conference(ESEC) and 9 ACM SIGSOFT Symposium on the Foundations of Software Engineering (FSE), Vienna, Austria, 2001, pp. 88-98.

* cited by examiner

METHODS AND ARRANGEMENTS TO MANAGE ON-CHIP MEMORY TO REDUCE MEMORY LATENCY

CROSS REFERENCE

This application is a continuation application of U.S. patent application Ser. No. 11/032,876 entitled METHODS AND ARRANGEMENTS TO MANAGE ON-CHIP MEMORY TO REDUCE MEMORY LATENCY, filed Jan. 11, 2005, the disclosure of which is incorporated herein in its entirety for all purposes.

GOVERNMENT INTERESTS

The present invention is in the field of computer hardware and software. This invention was made with Government support under the DARPA HPCS Program (Phase 1) contract number NBCHC020056. THE GOVERNMENT HAS CERTAIN RIGHTS IN THIS INVENTION.

FIELD OF INVENTION

The present invention generally relates to the field of cache management. More particularly, the present invention relates to methods and arrangements for the operating system or runtime system support used to reduce memory latency incurred by processors by providing a measure of control over on-chip memory (OCM) management to software applications.

BACKGROUND

Memory latency is one of the important performance bottlenecks in modern computer systems. Technology forecasts predict that the memory latency problem will only get exacerbated as the disparity between processor core speeds and memory speeds increases.

A common computer architecture technique to reduce the effective memory latency incurred by processors is caching. Processors can access cache memory much faster than main memory because of the physical proximity of the cache to the processor, the size of the cache compared to main memory, and the faster device technology that is commonly used to implement caches. Fundamentally, caches reduce memory latency by exploiting the temporal and spatial locality that is present in application program memory accesses. Memory latency is reduced by amortizing the memory latency incurred in retrieving memory (or cache) blocks (or lines) from main memory to the cache over the number of times that a cache line is reused due to locality.

Since caches are implemented in hardware, they use simple hardware mechanisms to increase their effective use of locality. First, they are typically organized in multi-byte cache lines in order to exploit spatial locality. Second, they use least-recently-used (LRU) or pseudo-LRU replacement policies to exploit temporal locality by keeping the most recently used cache lines in the cache. Unfortunately, the simple cache LRU replacement policy might not be effective for some applications due to a combination of the size and organization (e.g., degree of associativity) of the cache, and the memory access patterns of the application programs running on the computer system.

Another technique used in addition to caches to hide memory latency is prefetching. Hardware or software prefetching techniques can be used to predict cache lines that will be accessed in the near future by the processors and miss in the cache(s) and issue early memory fetches for those lines in anticipation of the processor access, thereby eliminating or reducing the memory latency stalls incurred by the processor as a cache miss is being serviced. Unfortunately, compiler algorithms or programmers might find it difficult to predict memory access behavior of an application at the cache line granularity in order to schedule the software prefetches sufficiently in advance of an access. Hardware prefetch techniques usually implement simple memory access pattern detection mechanisms, making it difficult for them to be effective for other memory access patterns.

For some applications, it is possible to overcome the aforementioned limitations of cache replacement algorithms and traditional hardware or software prefetch techniques to reduce and/or tolerate memory latency by giving application programs control over the placement of data in on-chip memory using cooperative application, and operating system support. In some applications, although it may be difficult to understand the caching behavior at the cache line level, information about critical data structures that need to be maintained closer to the processor may be readily available. In such cases, application programs can either explicitly issue block prefetch requests into an on-chip memory in order to ensure that affected memory locations are quickly accessible. Alternatively, applications may issue hints to the operating system requesting that such structures be allocated in on-chip memory. Applications can also explicitly free memory allocated in the on-chip memory banks or issue hints to the operating system to do so.

Therefore, there is a need for methods and arrangements for reducing memory latency incurred by processors by providing a measure of control over on-chip memory (OCM) management to software applications, implicitly and/or explicitly, via an operating system or runtime system.

SUMMARY OF THE INVENTION

This invention relates to the methods and arrangements used to provide cooperative application program and operating system management of on-chip memory. It describes two application programming interfaces (APIs) for managing OCM in order to reduce or tolerate memory latency and the operating system and hardware support that is needed to support these APIs. The two sets of APIs are referred to as the Explicit Model (EM) and the Implicit Model (IM), respectively.

The hardware implementation of the OCM itself can vary. For example, the OCM could be implemented by partitioning a cache into hardware and software managed portions, or by implementing dedicated on-chip memory banks. Although the choice of OCM implementation might change some of the implementation details of the underlying API in the target system, we will refer to any such embodiment as an OCM henceforth. This invention does not depend on the details of the hardware implementation and is applicable to a large spectrum of OCM implementations.

In the Explicit Model (EM), the operating system (OS) manages the hardware resource that is used as an OCM. This implies that the operating system is responsible for allocating this resource among applications, much like the way the OS manages physical main memory. It is also responsible for providing protection, address translation, and access to hardware data copy engines to overlap any copying necessary if supported by the underlying hardware. The EM provides applications with a set of functions that they can call to manage the contents of the OCM, such as allocation, copy, synchronization, and de-allocation functions. This API is simple to implement by the operating system and runtime libraries, but relies on the application programmer or compiler to insert the appropriate API calls to manage the OCM resource correctly.

The Implicit Model (IM) is considerably less demanding from the application programming perspective. It relies on applications to only provide hints to the operating system describing the programs "desire" to have some application memory addresses placed in the OCM in the hope of improving performance. It is then up to the operating system to allocate space, perform any address translation manipulations, memory copies, synchronization, etc. By allowing more control at the operating system level, the IM API also enables some interesting functionality in multiprocessor systems where multiple processors participating in a parallel computation each have a private OCM. For example, software distributed shared memory (s/w DSM) techniques may be used to support OCM-level coherence, even in implementations where the hardware does not provide such support.

BRIEF DESCRIPTION OF THE DRAWINGS

Other objects and advantages of the invention will become apparent upon reading the following detailed description and upon reference to the accompanying drawings in which, like references may indicate similar elements.

DETAILED DESCRIPTION OF EMBODIMENTS

Introduction

Figure 1:
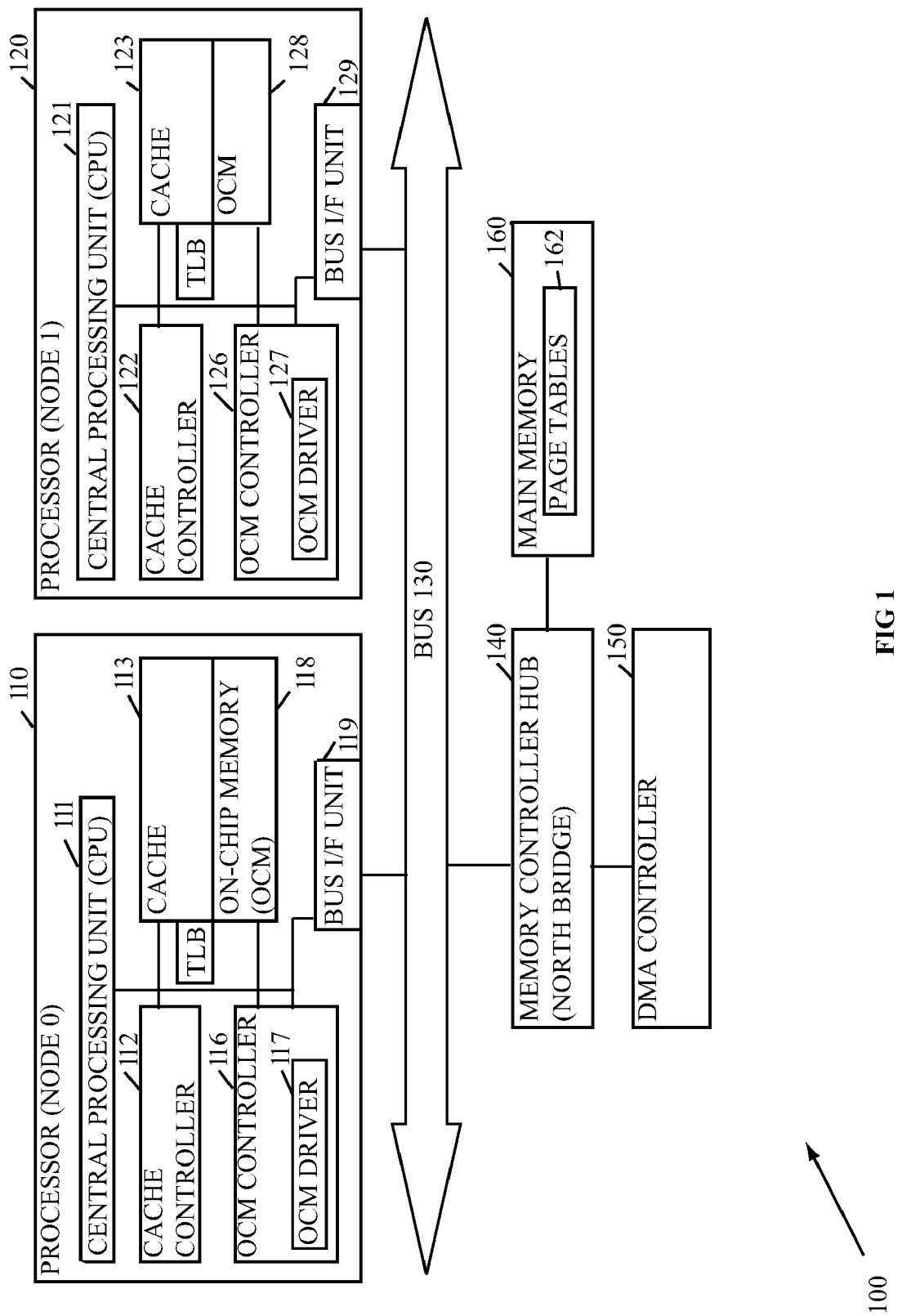
FIG. 1 depicts an embodiment of a system that provides a measure of control to a software application, over management of an on-chip memory (OCM hereafter)

The following is a detailed description of embodiments of the invention depicted in the accompanying drawings. The embodiments are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods and arrangements for reducing memory latency incurred by processors by providing a measure of control over on-chip memory (OCM) management to software applications, implicitly and/or explicitly, via an operating system or runtime system are contemplated. Many embodiments allow an OCM to be managed by software applications via an application programming interface (API), and partly managed by hardware. Thus, the software applications can provide guidance regarding address ranges to maintain close to the processor to reduce unnecessary latencies typically encountered when dependent upon cache controller or traditional compiler and/or hardware prefetching policies.

The Explicit and Implicit Model APIs are implemented using a combination of application linked libraries, device drivers, and operating system memory management support. The application linked libraries provide the implementation of the actual APIs, which, depending on the model used (EM or IM), communicate with the operating system and device drivers to implement the semantics of the defined application programming interfaces. Hardware accelerators may also be used for improved performance.

In the Explicit Model, applications that wish to utilize the OCM first have to allocate some memory in the OCM. The operating system might grant or deny that request, depending on the current state of the OCM resource or other OS constraints. If the allocation is successful, the application may then issue explicit copy commands through specific API calls to move some memory locations from main memory to the OCM. There are two versions of the copy API. A synchronous version and an asynchronous version. The synchronous version returns control back to the application only after the copy has completed. The asynchronous version allows the application to overlap the copy operation with computation by returning a handle (or unique identifier) of the copy operation that is later used to confirm that the operation has completed before the affected memory regions are accessed. When the application is finished using the OCM, it frees the affected regions, allowing the operating system to allocate them to other users.

In the Implicit Model, applications that wish to utilize the OCM do not have to explicitly manage the allocation of OCM storage, copying of data between main memory and the OCM, or inserting synchronization calls to ensure that copying has completed. All of these operations are handled by the operating system. The application program is only required to provide hints to the operating system about the regions of memory in its address space that application would prefer to be placed in the OCM. The operating system is then responsible for managing the allocation, copying, and synchronization operations involved in attempting to satisfy the application's request. The IM is a hint-based API, allowing the operating system to choose not to satisfy some requests under certain conditions (e.g., when the OCM storage is fully utilized). Allowing the operating system full control over the details of OCM usage allows two significant benefits. First, it reduces the burden on application programmers (or compilers), by requiring substantially fewer modifications to applications. Second, the IM allows the operating system to implement some beneficial support using standard address translation and memory management techniques. For example, the operating system can use protection exceptions to trigger copy operations and to provide explicit copy completion synchronization by mapping address regions in the OCM to protected virtual pages and modifying the translation structures accordingly. In multiprocessor systems with multiple OCM's that are not kept coherent in hardware and where an OCM is only accessible from a single chip, the operating system can implement special policies to address process migration, and to provide coherence in software similar to software distributed shared memory (s/w DSM) systems.

Besides the OCM itself, embodiments of this invention can significantly benefit from hardware off-load of copy operations in order to reduce the utilization of processor compute resources. Standard hardware techniques, such as direct memory access (DMA) controllers or programmable data prefetch engines, may be used for this purpose. Instead of performing the copies needed by the EM and IM APIs in software, a hardware apparatus designed for this purpose may be used.

While specific embodiments will be described below incorporating functions into specific hardware modules and/or software tiers, those of skill in the art will realize that embodiments of the present invention may advantageously implement these functions in other combinations of hardware and/or software, to advantageously reduce memory latency.

Multiprocessor System

Turning now to the drawings, FIG. 1 depicts an embodiment of a computer system 100 that, during normal operations, can provide a measure of control to a software application, over management of an on-chip memory referred to as On-Chip Memory (OCM) 118 and 128. System 100 is a multi-processor. System 100 includes processor nodes 110 and 120, bus 130, memory controller hub 140, DMA controller 150, and main memory 160.

Processor nodes 110 and 120 include central processing units (CPUs) 111 and 121, cache controllers 112 and 122, OCM controllers 116 and 126, caches 113 and 123, OCMs 118 and 128, and Bus Interface Units (BIUs) 119 and 129, respectively. Processor nodes 110 and 120 may also include other levels of cache (not shown). Just as the case is for main memory 160, the OCMs in the system are physical system resources that may be allocated to different logical partitions belonging to different operating systems by a partition manager. In that situation, each operating system will be allowed to access and manage a subset of the physical memory addresses residing in OCMs 118 and 128. In some embodiments, system 100 may have any number of processor nodes and any number of CPUs.

Cache controllers 112 and 122 may be hardware implementations of a cache policy to load instructions and data into levels of cache in response to cache misses by requests from processor nodes 110 and 120, respectively. Cache controllers 112 and 122 may also implement a cache line replacement policy that replaces the least recently used (LRU) cache lines with new cache lines loaded into cache 113 and 123, and a prefetching policy that monitors accesses to main memory 160 for repetitive patterns and prefetches contents of main memory 160 into the caches in response to recognized patterns. The data stored in OCMs 18 may only be cached into cache 113. The same is true for OCM 128 and cache 123. If a node contains multiple caches and processors, coherence between the cache copies and OCM copy of data is maintained only within the node (i.e., only within node 110). If a cache miss to a physical address contained in OCM 118 is handled by controller 112, the controller will save the data in cache 113 for example. The same applies to cache controller 122, cache 123, and OCM 128. Accesses from node 110 to OCM 128 on node 120 are not allowed in this system, but may be permitted in other embodiments with the necessary changes in the implementation of the management protocols.

OCM controller 116 is a memory controller for OCM 118 that functions substantially independently from cache controller 112. Its main functions are to read data from or write data to the OCM in response to processor requests or in the process of copying data to or from external memory such as main memory 160. OCM controller 116 is also responsible for participating in the coherence protocol within node 100 to maintain coherence between OCM data and any cached copies in node 100.

OCM 118 and 128 may be organized as flat memory having content managed by OCM controllers 116 and 126. In other words, OCM 118 and 128 may have unique physical addresses for system 100, or at least with respect to processor nodes 110 and 120, respectively. In the latter case, the processors' node identifications, e.g., zero for processor 110 and one for processor 120, may be utilized to uniquely address specific memory locations in OCM 118 and 128. Embodiments that treat OCM 118 and 128 as flat memory offer the additional advantage of avoiding the latencies involved with tags in typical cache arrangements. In other embodiments, addressing for OCM 118 and 128 are tag based like cache 113 and 123. In other embodiments, OCM 118 and 128 may include a dirty bit field per memory block to reduce memory copies. These bits indicate whether memory contained within the OCM memory block has been modified. This feature is advantageous in reducing the amount of data to transfer to main memory 160 when an application or the operating system needs to update main memory with the modifications made in the OCM memory.

OCM drivers 117 and 127 may be implemented in hardware, firmware, software, or any combination thereof. The embodiment described here uses an OCM driver that is primarily a software component within the operating system that is exercised by applications calling OCM management library software routines. However, the performance of an OCM management API may be significantly improved using programmable memory copy engines (e.g., DMA controllers). In some embodiments, a programmable DMA controller may be included in the OCM drivers 117 and 127. In other embodiments, the DMA controller may be implemented via an apparatus separate from the processor nodes 110 and 120 such as a direct memory access (DMA) controller 150. OCM drivers 117 and 127 may be dedicated for use by the OS for transferring memory lines between OCM 118 and 128 and main memory 160 and, in some embodiments, may advantageously reduce cycles utilized by processor nodes 110 and 120 for retrieving memory lines from main memory 160. In several embodiments, OCM drivers 117 and 127 may also transfer memory lines between OCM 118 and OCM 128 to implement cache coherence policies either with or without intermediate copies to main memory 160 through memory controller hub 140.

Processor nodes 110 and 120 are communicatively coupled with memory controller hub 140, often referred to as the north bridge, via BIUs 119 and 129 and bus 130. BIUs 119 and 129 coordinate communications between processor nodes 110 and 120, respectively, and bus 130. Bus 130 may be a main host bus adapted to transmit data between processor nodes 110 and 120, as well as between memory controller hub 140 and processor nodes 110 and 120.

Memory controller hub 140 is adapted to coordinate communications and data transfers between main memory 160 and processor nodes 110 and 120. In other words, memory controller hub 140 provides an interface between the processors and memory. Memory controller hub 140 is responsible for accepting memory read or write requests that are initiated by either the cache controllers 112 or 122, CPUs 111 or 121, or OCM drivers 117 or 127 in nodes 110 or 120. The memory hub performs the requested operation and may return data to the requesting node where the data may be stored in caches 113 or 123 or OCMs 118 or 128. Note that in a software-only implementation of the OCM drivers, the memory read and write operations will originate from the CPUs and communicate with memory controller hub 140 through cache controllers 112 and 122.

In some embodiments, memory controller hub 140 may implement a prefetching policy that prefetches contents of main memory 160 based upon indications from cache controllers 112 and 122 or OCM controllers 116 and 126, predetermined patterns, and/or in response to determined access request patterns. Implementing a prefetch policy in memory controller hub 140 can reduce latencies for the fetches initiated by cache controllers 112 and 122 and/or OCM controllers 116 and 126. In many embodiments, the prefetching policy of memory controller hub 140 may be modified dynamically based upon instructions from CPU 111 and/or 121.

Main memory 160 may be a large, shared, random access memory storage for system 100. Main memory 160 may include page tables 162 consisting of effective (or virtual) address to physical address translation entries. Page tables 162 may include per chip (or node) page tables for OCM 118 and 128 to facilitate a cache coherence policy for system 100.

Explicit Model Application Programming Interface

In this section, we described the Explicit Model API and the operating system support needed to implement it for system 100 in FIG. 1. The API itself consists of five functions: ocm_malloc( ), ocm_free( ), ocm_copy( ), ocm_prefetch( ), and ocm_wait( ). We will describe a preferred embodiment for each of these functions next.

The ocm_malloc(size) function is called by an application when it requests that size bytes be allocated from the local OCM. For example, referring to FIG. 1, if the application was running in node 110, this would be a request to allocate size bytes from OCM 118. The library implementing the API will call operating system routines to examine the amount of free space in said OCM. If size bytes are available for the application's use, the API call will return the memory address that will be associated with data in the OCM. Otherwise, a NULL (or 0) value is returned. The operating system will update its internal data structures to note that size bytes have been allocated (possibly padding the size to be aligned on page boundaries). Depending on the operating system's memory management implementation, the operating system might eagerly create page table entries specifying the address translation's corresponding to the allocated region. Alternatively, the operating system may choose to postpone the creation of the translations until the application attempts to use the OCM region. In that case, initial accesses to the OCM will generate a page fault that will trigger the operating system's memory management routines to create the appropriate translations before returning control to the application. Finally, since some embodiments will not allow access to external OCMs (e.g., node 110 accessing OCM 128), the operating system can implicitly pin the requesting process to only be scheduled on processors that have access to the respective OCM.

The ocm_free(address) function is called by an application when it desires to free an OCM region starting at address. Upon receiving this call the EM API library calls operating system routines to deallocate the region specified from the OCM, which effectively returns those OCM physical addresses to the free pool of addresses available for allocation. In addition, the operating system will adjust the page table translation entries to ensure that the application program may not legally access the effective address range associated with the freed region.

The ocm_copy(to, from, size) function is used by an application program when it requires a size byte sized synchronous copy operation to be performed. The EM API library triggers a set of operations to be performed. In a software implementation, this copy operation may be performed using standard memory copy library functions (e.g., memcpy in the standard C library). Since this is a synchronous operation, control does not return to the application program until the copy is completed. In an implementation that allows the offload of memory copies to a DMA-line controller (e.g., as part of the OCM drivers 117 or 127), the copy operation proceeds as follows. First, the addresses specified in the call to the API are translated into their physical address equivalents by interacting with the memory management structures of the operating system. Second, the hardware memory copy engine is programmed to perform the copy and the application program is suspended. The operating system (or device driver) used to program the memory copy (or DMA) controller will use either a polling or interrupt-driven mechanism to be notified of the completion of the copy. At that point, the operating system is notified to allow the application to proceed.

One of the drawbacks of the synchronous copy API is that the application may not be allowed to proceed with useful work while the copy is taking place. If applications are able to issue the copy requests before the data is required, it is possible to improve performance by allowing the application program to proceed with useful computation while the copies are taking place. This motivated the implementation of the ocm_prefetch(to, from, size) and ocm_wait(handle) API functions. The ocm_prefetch( ) function is used by the application when it requests that data be copies from or to the OCM from main memory when the copy operation is allowed to be asynchronous. The EM API library implements this call similar to the ocm_copy function with the exception that the application is allowed to proceed as soon as the copy operation is initiated. A handle that uniquely identifies the requested copy operation is returned to the application. When the application needs to ensure that the copy has taken place before accessing the region of memory involved, it makes a call to ocm_wait passing the handle as an argument. The EM API library communicates with the operating system (possibly using device driver services) to ensure that the copy operation is completed before the application program is allowed to proceed. In systems that support a DMA controller, the copy operation is performed by the hardware and special status registers or interrupts are used for copy completion notification. In software-only implementations, the copy operation may be offloaded to a software thread that is scheduled on a processor with access to the subject OCM and main memory. For multiprocessor systems, this results in improved performance as well.

When the EM API is used by a parallel application in a multiprocessor system with multiple OCMs, application programmers must take precautions and include any additional synchronization operations needed to ensure that modifications made in one OCM that need to be visible to other processes or threads that do not have access to that OCM are copied to a shared memory region in order to ensure correct execution. In general, programmers have to be aware of the semantics of OCM usage on the system.

In system embodiments that allow OCM data to be cached, all copies from OCM to memory of vice versa are kept coherent whether performed by software or hardware assistance through a DMA controller.

Implicit Model Application Programming Interface

The Implicit Model (IM) API seeks to reduce the burden on programmers and/or compilers and provide significant added functionality. It reduces the burden on programmers or compilers by only requiring programs to provide hints to the operating system about the desire to keep certain memory regions in the OCM for improved performance. The details of memory allocation, de-allocation, copy, and synchronization operations are handled by the underlying IM API library and the operating system.

Applications can provide a hint to the operating system to indicate that a region of memory may be placed in the OCM by calling the ocm_bind(addr, size, type) IM API function. This call provides a hint to the operating system to use OCM-specific memory management options for a memory region of size bytes starting at address addr. The type field is used to select a specific OCM memory management policy to be used by the operating system when handling the affected memory region. A preferred embodiment of this call utilizes two types: ONDEMAND, and ASYNCH. The ONDEMAND option informs the operating system that it is free to place addresses in the specify region in the OCM whenever it deems convenient, but definitely before accesses to the region are allowed to proceed. The operating system handles this option by read and write protecting the pages included in the memory region to prevent the application from accessing those pages while the copy is taking place. The operating system typically only performs the copy when the application attempts to read from or write to addresses in the affected memory address range, which triggers a page protection fault. The operating system memory management structures recognize that the region has been bound to the OCM (through the ocm_bind call) and triggers the copy operations. Once the memory operations are completed, the address translation entries are corrected to allow access and the application is allowed to proceed. In situations where the application does not wish to be stalled on initial accesses for copying to take place, the ASYNCH type may be used. This option informs the operating system that the application is able to schedule the memory copy operations using ocm_prefetch( ) calls that are similar to those used in the EM API with one significant exception. Instead of relying on the application to issue an ocm_wait( ) before accessing the affected memory region as in the EM case, the operating system implicilty performs synchronization by ensuring that the address translation entries for the memory region are read/write protected until the copy has taken place.

When an application is done using a memory region that is in the OCM, it can issue an ocm_release(addr) call when the ASYNCH bind type is used. This allows the operating system to issue an asynchronous copy from the OCM to main memory. Address translation mechanisms are used to ensure that the copy is complete before any accesses to the affected memory addresses are allowed to complete. Under the ONDEMAND policy, memory is only copied from OCM to memory upon receipt of an ocm_unbind(addr,size) call by the operating system. To ensure correctness, the unbind call has to copy any memory pages within the specified region that remain in the OCM to main memory before returning, possibly delaying the application. Providing the ocm_prefetch and ocm_release options under the ASYNCH policy provides a way for applications to avoid any stalls when ocm_unbind is called.

In our preferred embodiment, it is desirable to align memory regions on virtual page boundaries to ease the management of OCM. This is very desirable since we rely heavily on operating system memory management and address translation mechanisms to provide the OCM management functionality. Operating system memory management implementations typically operate at page granularity, so this is not a burdensome requirement. Further, it should be noted that the IM implementation may choose to ignore any request for OCM management by an application if OCM or other resources needed to satisfy the request are unavailable.

Additional functionality is enabled by the use of the IM API. For example, since memory address translation, OCM allocation, and copy operations are controlled by the operating system, support for software-controlled OCM coherence may be possible. In system 100 depicted in FIG. 1, it is possible for a parallel application to have processes or threads executing on both nodes 110 and 120 simultaneously while using the separate OCMs 118 and 128. The preferred embodiment assumes a multiprocessor system where the OCMs are only accessible by processors within their local node. If multiple processors exist per node or chip (as in chip multiprocessor systems), and coherence is supported among the multiple caches, we assume that local OCM data may be cached and is kept coherent with the contents of the OCM within a node. In this regard, the OCM controllers 112 and 122 are responsible for participating in cache coherence actions. OCMs are not kept coherent with memory or among themselves. In fact, the OCMs in such as system might map to distinct physical memory addresses in the system's memory address map. If a parallel application running on such a multiprocessor system wants to utilize the OCM memory on multiple nodes, it has to be aware of the non-coherent aspect of those memories. Our preferred embodiment allows the operating system to coordinate coherence between multiple OCMs in software. For example, if multiple threads or cooperative processes that share memory attempt to bind the same memory region to multiple OCMs, the operating system can employ virtual memory protection techniques to serialize accesses to those memory locations. Assume that a thread on node 110 performs an ocm_bind operation for a range of addresses and another thread on node 120 performs another ocm_bind to the same memory region. The operating system detects that situation using its OCM-specific memory management policies. The operating system upon detecting such a situation can enable software coherence actions that would read protect all memory pages involved. Threads that only read share those memory regions can proceed without delay; however, when write sharing occurs, page protection faults are used to perform coherence activity. If the thread on node 110 attempts to write to a shared page in the OCM, the operating system is invoked to handle the page protection fault, disallows access to the same page on node 120, and changes the protection fields in the translation entry on node 110 to allow the processor to modify the page. When the thread on node 120 attempts to read the same page, a read protection page fault occurs. At that point, the operating system will set the page to read-only mode on node 110, copy any modified blocks (using the dirty bits mentioned earlier to reduce the amount of data copied) to the OCM in node 120 to update its contents before allowing the thread on node 120 to continue. Other techniques from published research on software distributed shared memory (s/w DSM) systems may be adopted to improve the efficiency of this process. Our preferred embodiment does not perform the software coherence actions unless a special bit is set in the type field specified to the ocm_bind IM API call.

Direct Memory Access Engine

Figure 2:
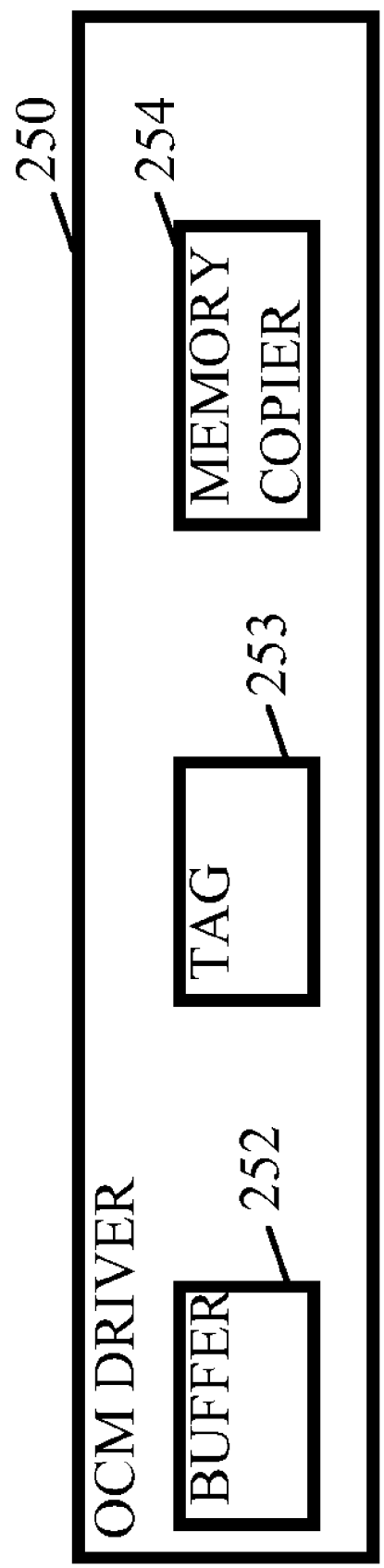
FIG. 2 depicts more detailed embodiments of a processor with OCM and an OCM driver of FIG. 1.

FIG. 2 depicts an embodiment for a direct memory access (DMA) engine implementation of an OCM driver 250, which performs some of the functions of the OCM driver 117 of FIG. 1 in hardware. OCM driver 250 may receive explicit instructions from an OS or a partition manager to transfer data between a main memory and a processor or between processors of a multiprocessor system to facilitate software cache coherence functionality for the OCMs as an example. Advantageously, OCM driver 250 may improve bandwidth utilization between main memory and processors transferring data in bulk rather than in cache-line sizes.

OCM driver 250 includes a buffer 252, a tag module 253, and a memory copier 254. Buffer 252 is capable of buffering multiple DMA transfer requests. Each request consists of a source physical address, a destination physical address, and a size. The source physical address, destination physical address, and size arguments are aligned at a cache-line granularity since that is the smallest granularity of data transfer handled by OCM driver 250. In some embodiments, OCM driver 250 does not provide address translation support, because the OS provides the effective address to physical address translations necessary to set up DMA transfers when they are requested by software applications. In addition, the OS may determine whether effective address memory regions are contiguous or not in physical memory to issue the correct number of transfers. In other embodiments, OCM driver 250 includes address translation capabilities.

Tag module 253 may associate each data transfer, which is responsive to a request that involves multiple transfers, with a tag. OCM driver 250 may then determine whether all transfers for a given tag have completed. In further embodiments, the OS may append tags to the data transfers to determine whether all the data transfers have completed.

Memory copier 254 may improve the performance of OCM 118 to main memory DMA transfers through the use of a dirty bit per OCM block. In particular, OCM driver 250 may move only those blocks marked as dirty to main memory when the block is moved back to main memory. Read-only pages, on the other hand, can simply be discarded from the OCM 118 if they were originally copied from main memory and the original copy is still in place.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods and arrangements for providing a measure of control over data stored in an OCM for a processor by a software application. It is understood that the form of the invention shown and described in the detailed description and the drawings are to be taken merely as examples. It is intended that the following claims be interpreted broadly to embrace all the variations of the example embodiments disclosed.

What is claimed is:

1. A method for controlling data stored in an on-chip memory sharing a chip with a processor and a cache by a software application, comprising:

allocating, within the on-chip memory of the chip, a block of processor memory address space for the data accessible by the processor via an on-chip memory controller responsive to an instruction from an operating system, the instruction being associated with the data, wherein allocating the block of the on-chip memory comprises allocating the block of the on-chip memory in response to an explicit instruction from the software application, the explicit instruction being substantially determinative of the occurrence of allocation of the block of the on-chip memory;

transferring the data from a main memory to the block within the on-chip memory via a direct memory access controller based upon an indication from the operating system, the direct memory access controller to transfer the data from the main memory and store the data in the block of the on-chip memory, the direct memory access controller to page out a content of the block prior to storing the data in the block;

accessing, by the processor, the block of the on-chip memory via the on-chip memory controller to obtain the data in response to a request for the data by the processor; and de-allocating the block in response to a subsequent instruction from the operating system.

2. The method of claim 1, further comprising updating a copy of the data in the main memory in response to modifying the data to maintain coherence.

3. The method of claim 1, further comprising delaying access by another processor to a copy of the data that is maintained in the main memory to maintain coherence.

4. The method of claim 1, further comprising issuing an instruction to delay access to the block of the on-chip memory while the data is being transferred to the block of the on-chip memory.

5. The method of claim 4, wherein allocating the block of the on-chip memory comprises allocating a logical portion of the block of the on-chip memory, wherein the logical portion is to be associated with physical addresses in response to an access to the block of the on-chip memory.

6. The method of claim 1, wherein transferring the data comprises transferring the data in response to the request for the data.

7. The method of claim 1, wherein allocating the block of the on-chip memory comprises allocating the block of the on-chip memory in response to the explicit instruction and prior to an initial access of the block.

8. The method of claim 1, wherein allocating the block of the on-chip memory comprises allocating the block of the on-chip memory after the explicit instruction and in response to an initial access request for the on-chip memory by the software application.

9. The method of claim 1, wherein transferring the data from a main memory to the block within the on-chip memory via a driver comprises transferring the data from a main memory to the block within the on-chip memory via a direct memory access engine.

* * * * *